US006839803B1

(12) United States Patent
Loh et al.

(10) Patent No.: US 6,839,803 B1
(45) Date of Patent: Jan. 4, 2005

(54) MULTI-TIER DATA STORAGE SYSTEM

(75) Inventors: Danny D. Loh, Fremont, CA (US); Jimmy Ping Fai Chui, Redwood City, CA (US)

(73) Assignee: Shutterfly, Inc., Redwood City, CA (US)

(*) Notice: Subject to any disclaimer, the term of this patent is extended or adjusted under 35 U.S.C. 154(b) by 565 days.

(21) Appl. No.: 09/428,871

(22) Filed: Oct. 27, 1999

(51) Int. Cl.[7] .............................................. G06F 12/00

(52) U.S. Cl. ........................ 711/113; 711/114; 711/161; 711/162

(58) Field of Search ......................... 711/111, 112, 113, 711/114, 161, 162

(56) References Cited

U.S. PATENT DOCUMENTS

| | | | | | |
|---|---|---|---|---|---|
| 5,179,637 | A | | 1/1993 | Nardozzi | 395/114 |
| 5,606,365 | A | | 2/1997 | Maurinus et al. | 348/222 |
| 5,696,850 | A | | 12/1997 | Parulski et al. | 382/261 |
| 5,748,194 | A | | 5/1998 | Chen | 345/427 |
| 5,751,950 | A | | 5/1998 | Crisan | 395/188 |
| 5,760,916 | A | | 6/1998 | Dellert et al. | 358/408 |
| 5,760,917 | A | | 6/1998 | Sheridan | 358/442 |
| 5,778,430 | A | | 7/1998 | Ish et al. | 711/133 |
| 5,787,459 | A | | 7/1998 | Stallmo et al. | 711/112 |
| 5,787,466 | A | | 7/1998 | Berliner | 711/117 |
| 5,790,176 | A | * | 8/1998 | Craig | 348/13 |
| 5,790,708 | A | | 8/1998 | Delean | 382/276 |
| 5,806,005 | A | | 9/1998 | Hull et al. | 455/566 |
| 5,809,280 | A | | 9/1998 | Chard et al. | 395/487 |
| 5,835,735 | A | | 11/1998 | Mason et al. | 395/287 |
| 5,890,213 | A | | 3/1999 | Sokolov | 711/113 |
| 5,903,728 | A | | 5/1999 | Semenzato | 395/200 |
| 5,907,640 | A | | 5/1999 | Delean | 382/276 |
| 5,913,088 | A | | 6/1999 | Moghadam et al. | 396/311 |
| 5,918,213 | A | | 6/1999 | Bernard et al. | 705/26 |
| 5,926,288 | A | | 7/1999 | Dellert et al. | 358/487 |
| 5,933,646 | A | | 8/1999 | Hendrickson et al. | 395/712 |
| 5,956,716 | A | * | 9/1999 | Kenner et al. | 707/10 |
| 5,960,411 | A | | 9/1999 | Hartman et al. | 705/26 |
| 6,017,157 | A | * | 1/2000 | Garfinkle et al. | 396/639 |
| 6,072,586 | A | * | 6/2000 | Bhargava et al. | 358/1.15 |
| 6,076,111 | A | * | 6/2000 | Chiu et al. | 709/232 |
| 6,085,195 | A | * | 7/2000 | Hoyt et al. | 707/10 |
| 6,104,468 | A | * | 8/2000 | Bryniarski et al. | 355/18 |
| 6,167,382 | A | * | 12/2000 | Sparks et al. | 705/26 |
| 6,215,559 | B1 | * | 4/2001 | Bryniarski et al. | 358/1.15 |
| 6,269,394 | B1 | * | 7/2001 | Kenner et al. | 709/217 |

FOREIGN PATENT DOCUMENTS

| | | |
|---|---|---|
| WO | WO 97/39580 | 10/1997 |
| WO | WO 98/36556 | 8/1998 |

* cited by examiner

*Primary Examiner*—Kevin Verbrugge
(74) *Attorney, Agent, or Firm*—Tran & Associates

(57) ABSTRACT

A multi-tier data storage system includes a first data storage unit for storing recently loaded data files; a second data storage unit coupled to the first data storage unit for archiving data files residing on the first data storage unit for more than a predetermined period of time; and, a third data storage unit coupled to the second data storage unit, the third data storage unit caching files archived in the second data storage unit if the data file is unavailable on the first data storage unit.

90 Claims, 13 Drawing Sheets

MULTI-TIER DATA STORAGE SYSTEM

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The invention relates generally to the field of computer data storage, and in particular, to a multi-tier data storage system and methods for handling data in the multi-tier data storage system.

The rapid rate of innovation in processor engineering has resulted in an impressive leap in performance from one computer generation to the next. While the processing capability of the computer has increased tremendously, the input/output (I/O) speed of secondary storage devices such as disk drives has not kept pace. Whereas the processing performance is largely related to the speed of its electronic components, disk drive I/O performance is dominated by the time it takes for the mechanical parts of the disk drives to move to the location where the data is stored, known as a seek and rotational times. On the average, the seek or rotational time for random accesses to disk drives is an order of magnitude longer than the data transfer time of the data between the processor and the disk drive. Thus, a throughput imbalance exists between the processor and the disk system.

To minimize this imbalance, conventional disk systems typically use a disk cache to buffer the data transfer between the host processor and the disk drive. The disk cache reduces the number of actual disk I/O transfers since there is a high probability that the data accessed is already in the faster disk cache. The operating principle of the disk cache is the same as that of a central processing unit (CPU) cache. The first time a program or data location is addressed, it must be accessed from the lower-speed disk memory. Subsequent accesses to the same code or data are then done via the faster cache memory, thereby minimizing its access time and enhancing overall system performance. The access time of a magnetic disk unit is normally about 10 to 20 ms, while the access time of the disk cache is about one to three milliseconds. Hence, the overall I/O performance is improved because the disk cache increases the ratio of relatively fast cache memory accesses to the relatively slow disk I/O access. The caching principle can be further extended so that faster disks act as caches for slower data storage devices. For instance, a magnetic data storage device can cache data from a slower device such as a compact disk (CD) drive, a digital video disk (DVD) drive, or an archival tape/optical disk back-up system.

Many applications require the architecture of the data storage system needs to provide varying degrees of high performance, reliability and cost-effectiveness. For instance, media server applications need to support widespread availability of interactive multimedia services such as for viewing and retrieving high-resolution digital photographic images. Other applications include video-on-demand (VOD), teleshopping, digital video broadcasting and distance learning. Typically, a media server retrieves digital multimedia bit streams from storage devices and delivers the streams to clients at an appropriate delivery rate. The multimedia bit streams represent video, audio and other types of data, and each stream may be delivered subject to quality-of-service (QOS) constraints such as average bit rate or maximum delay jitter. An important performance criterion for a media server and its corresponding multimedia delivery system is the maximum number of multimedia streams, and thus the number of clients, that can be simultaneously supported. In addition to being performance driven, these multimedia servers require their data storage systems to be able to store, retrieve and archive terabytes of data across diverse and geographically distributed networks. Further, to be commercially successful, these requirements should be provided as cost-effectively as possible.

SUMMARY

A multi-tier data storage system includes a first data storage unit for storing recently loaded data files; a second data storage unit coupled to the first data storage unit for storing data files residing on the first data storage unit for more than a predetermined period of time; and, a third data storage unit coupled to the second data storage unit, the third data storage unit storing a data file stored in the second data storage unit if the data file is unavailable on the first data storage unit.

Implementations of the system may include one or more of the following. The first data storage unit may be an available and reliable data storage system. The second data storage unit may be a jukebox. The third data storage unit may be an inexpensive and available data storage system. There may also be a backup data storage device coupled to the first data storage unit, which may be connected to a tape drive. The second data storage unit may be a writeable digital video disk (DVD). The first data storage unit may be a RAID disk array. The data storage units may contain data files which are imaging data files. The data files may be based on a unique identification encoding, wherein the unique identification encoding includes a location value, a timestamp, and/or an image type value. The data storage unit may have a three-tiered directory lay-out schema which may include a tier based on the year, the month, and the day when an image is submitted. The three-tiered directory lay-out schema includes a tier based on the hour and the minute when an image is submitted. The three-tiered directory lay-out schema may include a tier based on a user identification value. The data files may also include one or more thumbnail and raw images stored on the first data storage unit. Also, the data files may include one or more screen image files and cached raw image files stored on the third data storage unit.

In another aspect, a method manages a multi-tier data storage system by storing recently loaded data files in a first data storage unit; storing in a second data storage unit data files residing on the first data storage unit for more than a predetermined period of time; and, storing in a third data storage unit a data file stored in the second data storage unit if the data file is unavailable on the first data storage unit.

Implementations of the method includes one or more of the following. The first data storage unit may operate as an available and reliable data storage system. The second data storage unit may include an archival device. The third data storage unit may include an inexpensive and available data storage system. The data files may image data files. The data file may be indexed based on a unique identification encoding, a location value, a user identification value, a timestamp, and/or an image type value. Each data storage unit may have a three-tiered directory lay-out schema which may include a tier based on the year, the month, and the day when an image is submitted. The three-tiered directory lay-out schema may also include a tier based on the hour and the minute when an image is submitted. The three-tiered directory lay-out schema includes a tier based on a user identification value. The data files may include one or more thumbnail images stored on the first data storage unit. The data files may include one or more screen image files and raw image files stored on the first and third data storage unit.

Another aspect includes a method for generating a path name directory by generating a unique file identification value based on a location value, a user identification value, a timestamp, and an image type; and storing data files based on generated unique identification values. Each data storage unit may have a three-tiered directory lay-out schema. The three-tiered directory lay-out schema may include a tier based on the year, the month, and the day when an image is submitted. The three-tiered directory lay-out schema may includes a tier based on the hour and the minute when an image includes submitted and may also include a tier based on a user identification value. The unique identification value may include an image identification value. The retrieval of a file may be based on the unique identification value and the file may also be retrieved without referencing a file name database.

Yet another aspect includes a computer-implemented method for managing a digital image data storage system. A digital image may be stored in a first image storage tier having predetermined performance characteristics. The method includes moving a digital image from the first image storage tier to one or more other image storage tiers based on a predetermined criterion. The other image storage tiers may have performance characteristics different from the first image storage tier's performance characteristics.

Implementations of the system may include one or more of the following. The other storage tiers may have a second image storage tier and a third image storage tier, each having different performance characteristics. The performance characteristics of the first image tier may include high availability, reliability and cost. The performance characteristics of the second image tier may also include a large archival capacity and may be inexpensive, and the performance characteristics of the third image tier may include high availability and intermediate cost.

In another aspect, a computer-implemented method stores recently loaded data files in the first data storage unit. The method also includes storing in the second data storage unit data files residing on the first data storage unit for more than a predetermined period of time; and, storing in the third data storage unit a data file stored in the second data storage unit if the data file is unavailable on the first data storage unit.

In yet another aspect, the system may contain a computer-implemented method for storing digital images. The method includes distributing digital images across a plurality of interconnected image storage tiers, each tier having a combination of reliability and availability characteristics that differs from the other image storage tiers, based on predetermined storage policy criteria.

Implementations of the system may include one or more of the following. The other storage tiers may have a second image storage tier and a third image storage tier, each having different performance characteristics. The performance characteristics of the first image tier may include high availability, reliability and cost. The performance characteristics of the second image tier may include a large archival capacity and may be inexpensive. The performance characteristics of the third image tier may include high availability and intermediate in cost.

In another aspect, the system may execute a method of storing recently loaded data files in the first data storage unit; storing in the second data storage unit data files residing on the first data storage unit for more than a predetermined period of time; and, storing in the third data storage unit a data file stored in the second data storage unit if the data file is unavailable on the first data storage unit.

Implementations of the system may include one or more of the following. The system may contain a digital image storage system which may have a plurality of interconnected image storage tiers, each tier having a combination of reliability and availability characteristics that differs from the other image storage tiers. The system can execute a plurality of predetermined image storage policies. A controller is provided for moving digital images among different image storage tiers based on the plurality of predetermined image storage policies.

Implementations of the system may include one or more of the following. The other storage tiers comprise a second image storage tier and a third image storage tier, each having different performance characteristics. The performance characteristics of the first image tier may include high availability, reliability and cost. The performance characteristics of the second image tier may include a large archival capacity and inexpensive. The performance characteristics of the third image tier may include high availability and intermediate cost.

In yet another aspect, the system may also support a computer-implemented method of storing recently loaded data files in the first data storage unit; storing in the second data storage unit data files residing on the first data storage unit for more than a predetermined period of time; and, storing in the third data storage unit a data file stored in the second data storage unit if the data file is unavailable on the first data storage unit.

The system may also implement a protocol for managing a digital image storage system, with the protocol having a unique file identification value based on a location value, a user identification value, a timestamp, and an image type; and data files that are stored based on generated unique identification values. Each data storage unit may have a three-tiered directory lay-out schema. The three-tiered directory lay-out schema may include a tier based on the year, the month, and the day when an image is submitted. The three-tiered directory lay-out schema may also include a tier based on the hour and the minute when an image includes submitted or may include a tier based on a user identification value. The unique identification value may include an image identification value. A file may be retrieved based on the unique identification value and the file may be retrieved without referencing a file name database.

In addition, the system may also implement a protocol method for managing a digital image storage system for storing recently loaded data files in a first data storage unit. The protocol includes storing in a second data storage unit data files residing on the first data storage unit for more than a predetermined period of time; and, storing in a third data storage unit a data file stored in the second data storage unit if the data file is unavailable on the first data storage unit. The first data storage unit may include an available and reliable data storage system. The second data storage unit may include an archival device. The third data storage unit may include an inexpensive and available data storage system. The data files may be imaging data files.

In yet another aspect, the system may also provide a computer-implemented method for managing a digital image storage system of storing, upon receipt, a received digital image in a first image storage tier having a high degrees of reliability and availability; detecting that the digital image has resided on the first image storage tier for a predetermined period of time; moving the digital image from the first image storage tier to a second image storage tier having a high degree of reliability and a low degree of availability; detecting that an attempt to access the digital image on the first image storage tier was unsuccessful; and moving the digital image from the second image storage tier to a third image storage tier having a low degree of reliability and a high degree of availability. This may also provide access to a digital image on third tier.

In yet another aspect, the system may also contain a method for storing data files based on a unique identification encoding. The unique identification encoding may include a location value. The unique identification encoding may include a user identification value and the unique identification encoding may include a timestamp. The unique identification encoding may include an image type value. Each data storage unit may have a three-tiered directory lay-out schema. The three-tiered directory lay-out schema may include a tier based on the year, the month, and the day when an image is submitted. The three-tiered directory lay-out schema may include a tier based on the hour and the minute when an image is submitted. The three-tiered directory lay-out schema may also include a tier based on a user identification value.

The present invention also presents a method for managing a digital image storage system by generating a functional path name directory based on a unique file identification value; and storing data files based on generated unique identification values.

The systems and techniques described here may provide on or more of the following features/advantages. The system provides high performance, reliable, yet cost-effective multi-tier data storage capacity for clients whose data storage requirements increase continuously. For example, all data files can be archived, including all print image data files, whose value increases with time. The multi-tier storage system provides the ability to trade-off the average archival cost against the availability of images.

Further, the file naming convention provides scalability as well as rapid retrieval of data files stored in the multi-tier storage system. Using the file naming convention, a particular file associated with a user can be located without incurring the cost of accessing a file system database. The file naming convention also supports a balanced directory structure. The balanced directory structure in turn avoids an operating system limit on the maximum number of child directories within a directory node.

Database-related bottlenecks are decoupled from data retrieval-related bottlenecks. Data retrieval bandwidth can be scaled by simply increasing the number of data file servers. Additionally, since the database is not needed in retrieving data, the system can arbitrarily increase data retrieval reliability by replicating only a small part of the database, i.e. data list tables, provided that the table containing the data list is decoupled from the remaining tables. Further, in the event of a catastrophic database failure, the data list table can be re-constructed from the data archive.

Improved response times and more efficient use of bandwidth are supported through the use of a caching strategy. If requested objects are in a cache, the requests are fulfilled virtually instantaneously. Meanwhile, requests for older files not maintained in the cache are directed to a slower, but less expensive server to be fulfilled. When clients get objects from caches, they do not use as much bandwidth as if the object came from the slow server. Scalability exists to grow the user's business and expand the customer base. The system also integrates easily into multi-platform enterprise environments and provides shared access to UNIX, Windows and Web data.

Other features and advantages will become apparent from the following description, including the drawings and the claims.

DRAWING DESCRIPTIONS

DETAILED DESCRIPTION

Figure 1:
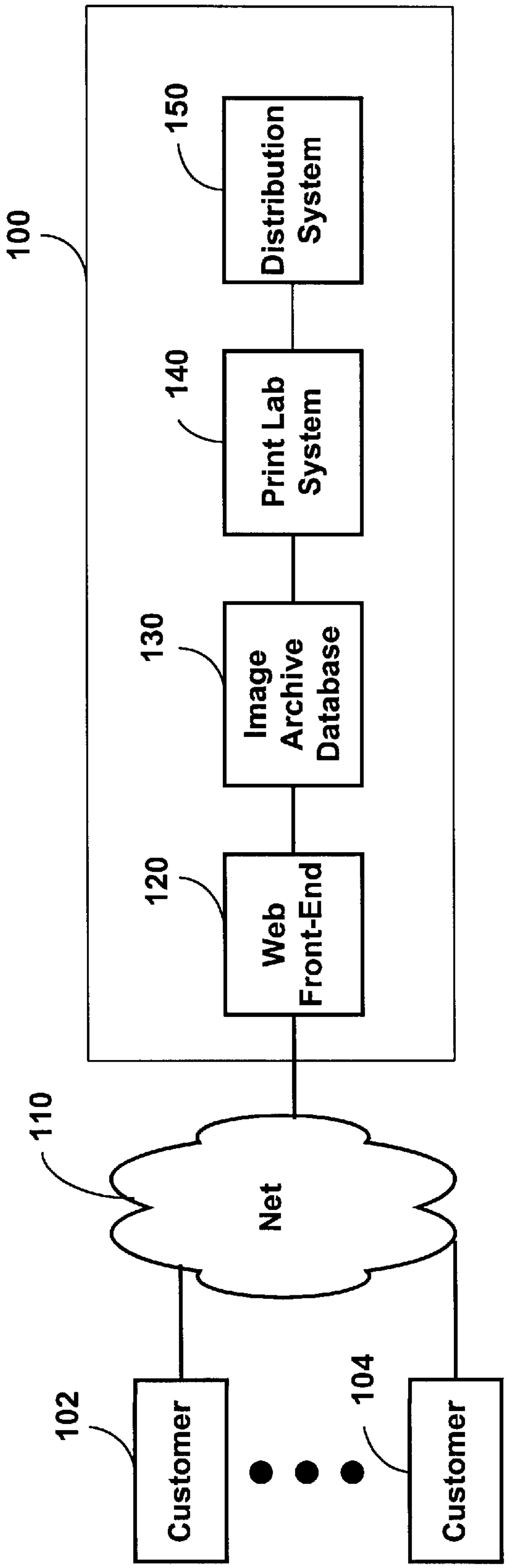
FIG. 1 is a block diagram of a system with a multi-tier data storage system.

FIG. 1 provides an overview of one deployment of a multi-tier image archive database. In FIG. 1, one or more customers 102–104 communicate with a system 100 over a wide area network 110 such as the Internet. In one embodiment, the system 100 stores digital images that have been submitted by the customers 102–104 over the Internet for subsequent printing and delivery to the customers 102–104.

The system 110 has a web front-end computer 120 that is connected to the network 110. The web front-end computer 120 communicates with an image archive database 130 and provides requested information and/or performs requested operations based on input from the customers 102–104. The image archive database 130 captures images submitted by the customers 102–104 and archives these images for rapid retrieval when needed. The information stored in the image archive database 130 in turn is provided to a print laboratory system 140 for generating high resolution, high quality photographic prints. The output from the print lab system 140 in turn is provided to a distribution system 150 that delivers the physical printouts to the customers 102–104. Each of the components 120, 130, 140, 150 can be local or distributed relative to each other and further can be controlled by a single enterprise or shared among two or more enterprises.

Figure 2:
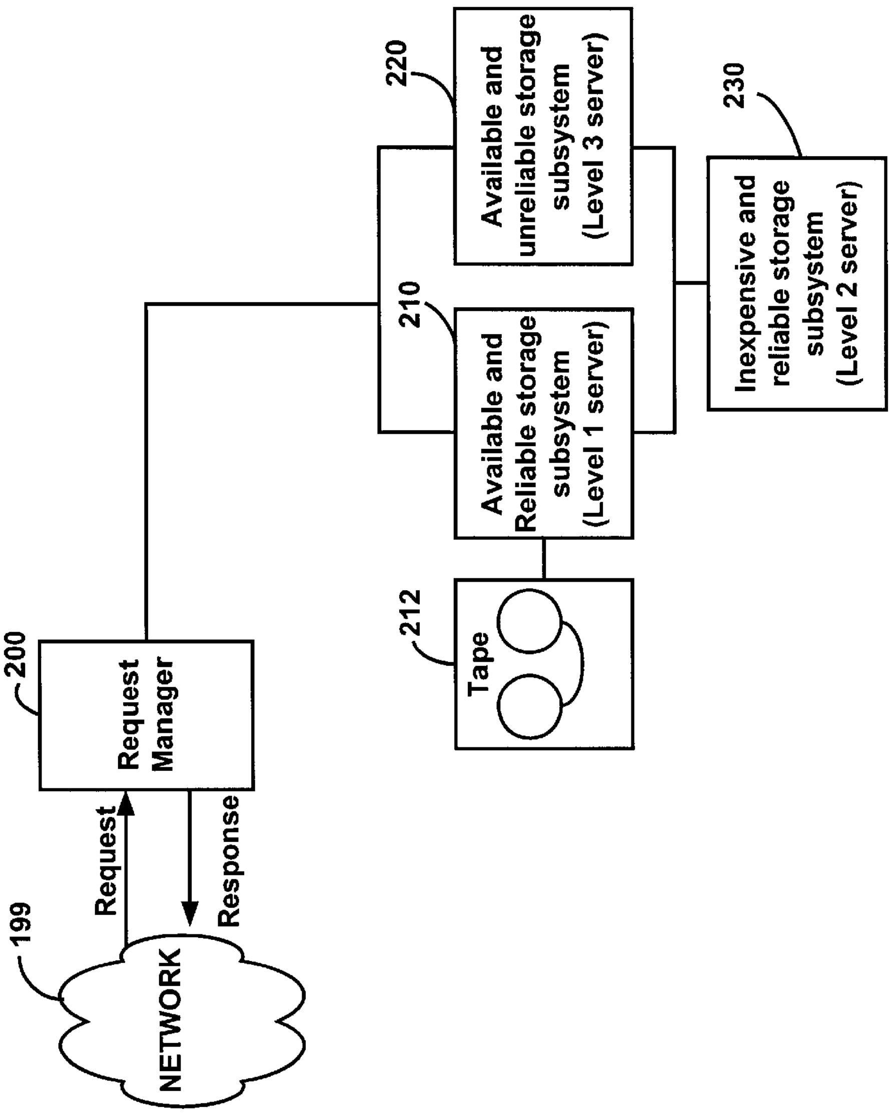
FIG. 2 is a block diagram illustrating more detail of the multi-tier data storage system of FIG. 1.

Referring now to FIG. 2, the image archive database system 130 is illustrated in more detail. The image archive database 130 receives incoming requests over a network 199. The web front-end 120 also is connected to this network 199. The incoming requests are presented to a request manager 200. The request manager 200 forwards the request to a Level 1 server 210 that represents an available and a reliable storage subsystem. An archival system 212 also is connected to the Level 1 server 210 to provide daily backup.

The storage subsystem may be a Redundant Arrays of Inexpensive Disks (RAID) level 1–5 subsystem. Each RAID level provides higher reliability than the previous RAID level. For instance, the RAID 5 architecture uses the same parity error correction concept of the RAID 4 architecture and independent actuators, but improves on the writing performance of a RAID 4 system by distributing the data and parity information across all of the available disk drives. Typically, "N+1" storage units in a set (also known as a "redundancy group") are divided into a plurality of equally sized address areas referred to as blocks. Each storage unit generally contains the same number of blocks. Blocks from each storage unit in a redundancy group having the same unit address ranges are referred to as "stripes." Each stripe has N blocks of data, plus one parity block on one storage device containing parity for the N data blocks of the stripe. Further stripes each have a parity block the parity blocks being distributed on different storage units. Parity updating activity associated with every modification of data in a redundancy group is therefore distributed over the different storage units. No single unit is burdened with all of the parity update activity.

To illustrate, in a RAID 5 system with 5 disk drives, the parity information for the first stripe of blocks may be written to the fifth drive; the parity information for the second stripe of blocks may be written to the fourth drive; the parity information for the third stripe of blocks may be written to the third drive; etc. The parity block for succeeding stripes typically "precesses" around the disk drives in a helical pattern (although other patterns may be used).

The Level 1 server 210 can be a Sun 4500 series server, available from Sun Microsystems, Inc. This particular system provides up to one terabyte of RAIDS storage capacity. Including the host, an embodiment using the Sun 4500 server provides storage capacity at approximately $0.08 per image.

The Level 1 server 210 communicates with a Level 2 server 230 that archives data stored in the Level 1 server 210. The Level 2 server 230 provides an inexpensive and reliable storage subsystem. However, since this class of storage subsystem cannot fulfill requests quickly, the Level 2 server is considered to be an "unavailable" data storage subsystem, meaning that the Level 2 server effectively is unable to fulfill real time or near real time requests. Examples of this type of server include jukebox servers that use writable DVD discs. Each jukebox can hold 120, 240 or 480 discs and depending on the media types used, can provide storage capacities range to over four terabytes in the 480 slot configuration. In one embodiment, a DVD jukebox server stores images at a cost of approximately $0.01 per image.

The request manager 200 and the Level 2 server 230 also communicate with a Level 3 server 220 that represents an available, but relatively "unreliable" storage subsystem. The Level 3 server 220 can be a PC-based server such as servers available from Dell Computers in Austin, Tex. or Compaq in Houston, Tex. The Level 3 server 220 provides storage at a cost of approximately $0.04 per image.

The above described three-tier architecture provides improved response times and more efficient use of bandwidth: if requested objects are cached in the Level 1 server, the requests are fulfilled virtually instantaneously. Requests for objects that have been archived are cached in the Level 3 server, so the desired data is copied to the Level 3 server and provided to the user as a response. The Level 3 caches this data, since it is likely to be used again. Meanwhile, requests for older files not maintained in either the Level 1 or 3 caches are directed to a slower, but less expensive server to be fulfilled. When clients get objects from caches, they do not use as much bandwidth as if the object came from the slow server.

To provide a system-wide uniqueness for each user image file, a file identification system is used. In one embodiment for storing images, an image identification encoding system has four major parts:

1) Location encoding value (one byte)
2) User ID encoding value (nine bytes)
3) Timestamp (17 bytes)
4) Image encoding type (three bytes)

One image identification format is as follows:

LuuuuuuuuuYYYYMMDDHHMMSSmmm.XXX where:

L a location encoding value.
uuuuuuuuu an encoding for user ID.
YYYY the submission year of the file.
MM the submission month of the file.
DD the day the file was submitted.
HH the hour the file was submitted.
MM the minute the file was submitted.
SS the second the file was submitted.
mmm the millisecond the file was submitted.
XXX an extension specifying image file format (e.g. JPG, MPEG)

The location encoding value supports an efficient system for distributing user files over a plurality of servers (scalability), as discussed in more detail below. The distribution strategy can be based on a registration order (e.g. round robin) and/or based on a geographical region.

The user ID encoding value allows the system to efficiently generate an overall disk usage report to support space restrictions imposed on the users. Thus, to detect that a particular user has exceeded his or her limit, a system administrator or software can simply run a directory query to generate a report for each user space consumption. This ability enhances maintainability.

The timestamp allows the system to easily identify newly uploaded data by day, by hour, by second or even finer granularity such as by millisecond or by microsecond if necessary. The timestamp provides a mechanism for uniquely identifying files based on the upload time. This capability makes incremental backup and recovery relatively easy, since backup operations can simply resume from the last time the data was archived. Hence, the timestamp enhances maintainability. Moreover, the user encoding value, together with the timestamp, supports an efficient way to generate disk usage report by user and by day to support any aging limit on user storage limits. The report can be generated by executing a directory command, which lists directories. Here, as the directories are based on user encoding values, a report showing each user's name and total disk space consumed by the user can be generated with ease.

The system of FIG. 2 also uses a three-tiered directory lay-out schema:

1) The first level is YYYYMMDD (where YYYY is the year, MM is the month and DD is the day of the month when the file is created). The maximum number of entries in this level is 366 per year.

2) The second level is HHMM (where HH is the hour and MM is the minute). In one embodiment, the maximum number of entries in this level is 3600.

3) The third level is the UID (same encoding as in the Image ID). The maximum number of entries in this level depends on the number of active users (users in one or more upload sessions at that particular period).

Using the above three-tiered schema, the directory structure can be derived from the Image ID alone. No database request to perform directory look-up is needed.

In sum, the combination of all four parts of the Image ID allows the system to provide a simple, yet fast cache manager, that has the function of looking the physical location of an image within a multi-tier system given an Image ID. All of this can be done without incurring a significant directory look-up database access cost or maintaining a large look-up table in memory.

FIGS. 3–7 show details associated with the data storage policy implemented by the servers 210, 220 and 230. In one embodiment, the following data storage policy is used:

I. Freshly uploaded raw data such as images are stored in the Level 1 storage. The Level 1 storage provides high performance and reliability. A thumbnail image and one or more screen size (full-size) images can be generated when the raw data associated with each image is uploaded. In one embodiment, the thumbnail image is saved on the Level 1 storage, while the screen size images are stored in the Level 3 storage. In one embodiment, thumbnail images are stored in the Level 1 storage since thumbnail images may need to be constantly available, that is, even if the rest of the system is down, the user can still retrieve his or her thumbnail images.

II. After a fixed period of time (for example, 3 months), the raw image files are archived to the Level 2 storage and a cached copy is kept in the Level 3 storage. The copy in the Level 3 storage is accessed by a print lab for printing.

III. A fixed amount of Level 1 storage is allocated per user for the storage of thumbnail images. A "Least Recently Used" algorithm can be used to remove images once the total thumbnail images exceed the allocated capacity.

IV. A fixed amount of Level 1 and Level 3 storage is allocated per user for the storage of screen and raw size images, respectively. A Least Recently Used algorithm is used to remove images once the total screen images exceeded the allocated capacity.

The replacement strategies I–IV determine which print data file is to be removed from the Level 1 disk or data storage system at a given time thereby making room for newer, additional print data files to occupy the limited space within the Level 1 disk. The choice of a replacement strategy must be done carefully, because a wrong choice can lead to poor performance for the data storage system, thereby negatively impacting the overall computer system performance.

The least-recently-used (LRU) replacement strategy replaces a least-recently-used resident print file. Generally speaking, the LRU strategy provides higher performance than a first-in, first-out (FIFO) strategy. The reason is that LRU takes into account the patterns of program behavior by assuming that the print file used in the most distant past is least likely to be referenced in the near future. When employed as a disk cache replacement strategy, the LRU strategy does not result in the replacement of a print file immediately before the print file is referenced again, which can be a common and often undesirable occurrence in systems employing the FIFO strategy.

Alternatively, the FIFO strategy (also known as a "pure aging" policy) can replace the resident data files that have spent the longest time in-the Level 1 disk. Whenever a block is to be evicted from the Level 1 disk, the oldest data file is identified and removed from the Level 1 disk. A cache manager resident on the Level 1 disk tracks the relative order of the loading of the data files into the Level 1 disk. This can be done by maintaining a FIFO queue for each data file. With such a queue, the "oldest" data file always is removed, i.e., the data files leave the queue in the same order that they entered it. Although relatively easy to implement, the FIFO strategy is typically not a preferred replacement strategy. By failing to take into account the pattern of usage of a given block, the FIFO strategy tends to discard frequently used files because they naturally tend to stay longer in the Level 1 disk.

Figure 3:
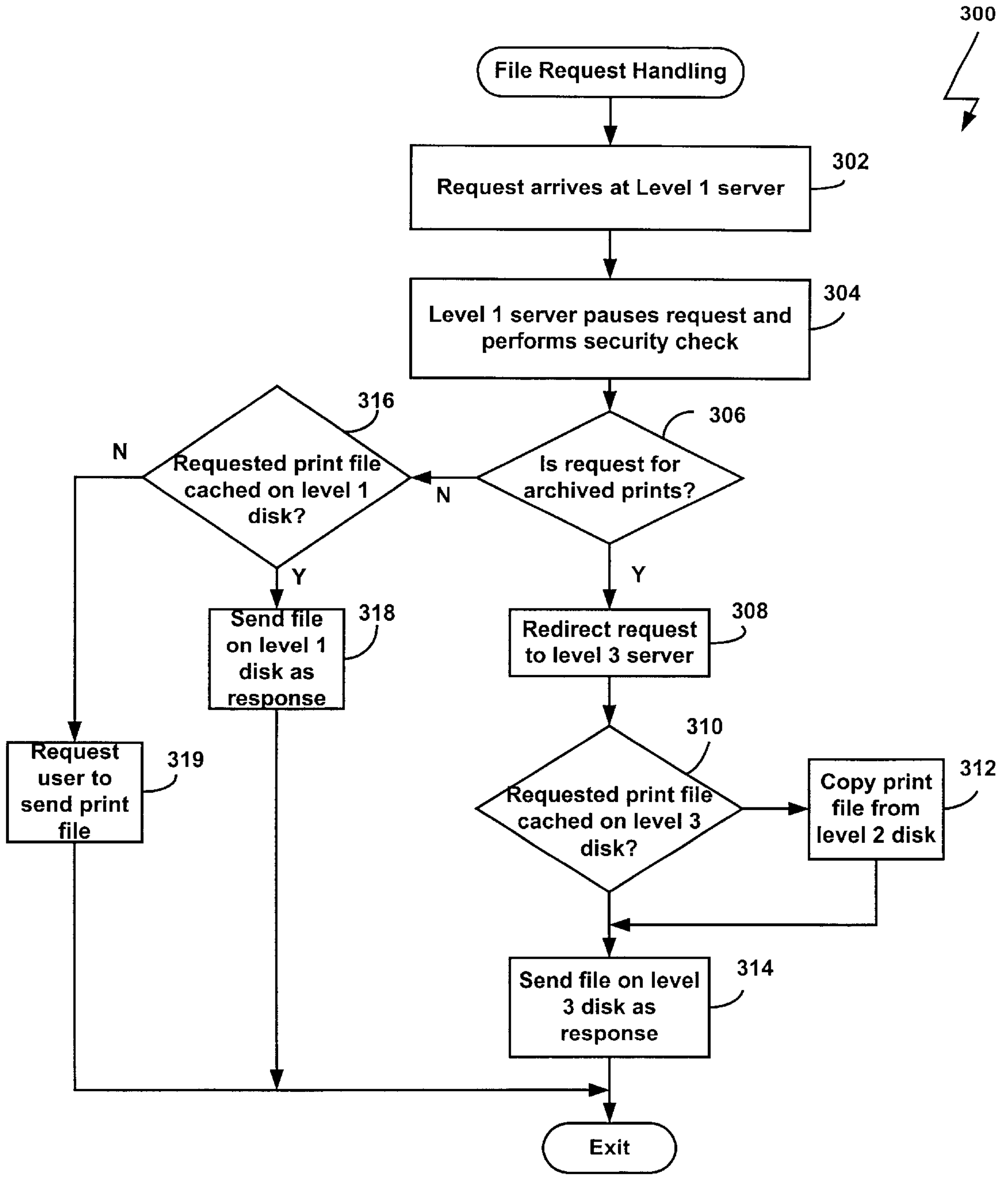
FIG. 3 is a flowchart of a process executed by the multi-tier data storage system of FIG. 2.

Referring now to FIG. 3, a process 300 for handling file requests directed at the request manager 200 is shown. First, the request arrives at a Level 1 server 210 (step 302). Next, the Level 1 server 210 parses the request and performs various security checks to ensure that the requesting client user is authorized to receive the information (step 304). Next, the process 300 checks whether the request is directed at archived images (step 306). If so, the process 300 redirects the request from the Level 1 server 210 to the Level 3 server 220 (step 308).

From step 308, the process 300 checks whether the requested image file is cached in the Level 3 server's disk (step 310). If not, the Level 3 server 220 copies the needed image file from the disk of the Level 2 server 230 (step 312). From step 310 or 312, the process 300 sends the file from the Level 3 disk as a response to the request manager 200 (step 314). From then, the request manager 200 forwards the response to the requesting client.

From step 306, if the request is not directed at archived images, the process 300 checks whether the requested image file is cached on the disk of the Level 1 server 210 (step 316). If so, the file is sent from the Level 1 server disk as a response (step 318). Alternatively, if the requested image file is not cached on the Level 1 disk, the process 300 requests the user to upload the image file to the Level 1 server (step 319). From step 314, 318 or 319, the process 300 exits.

Figure 4:
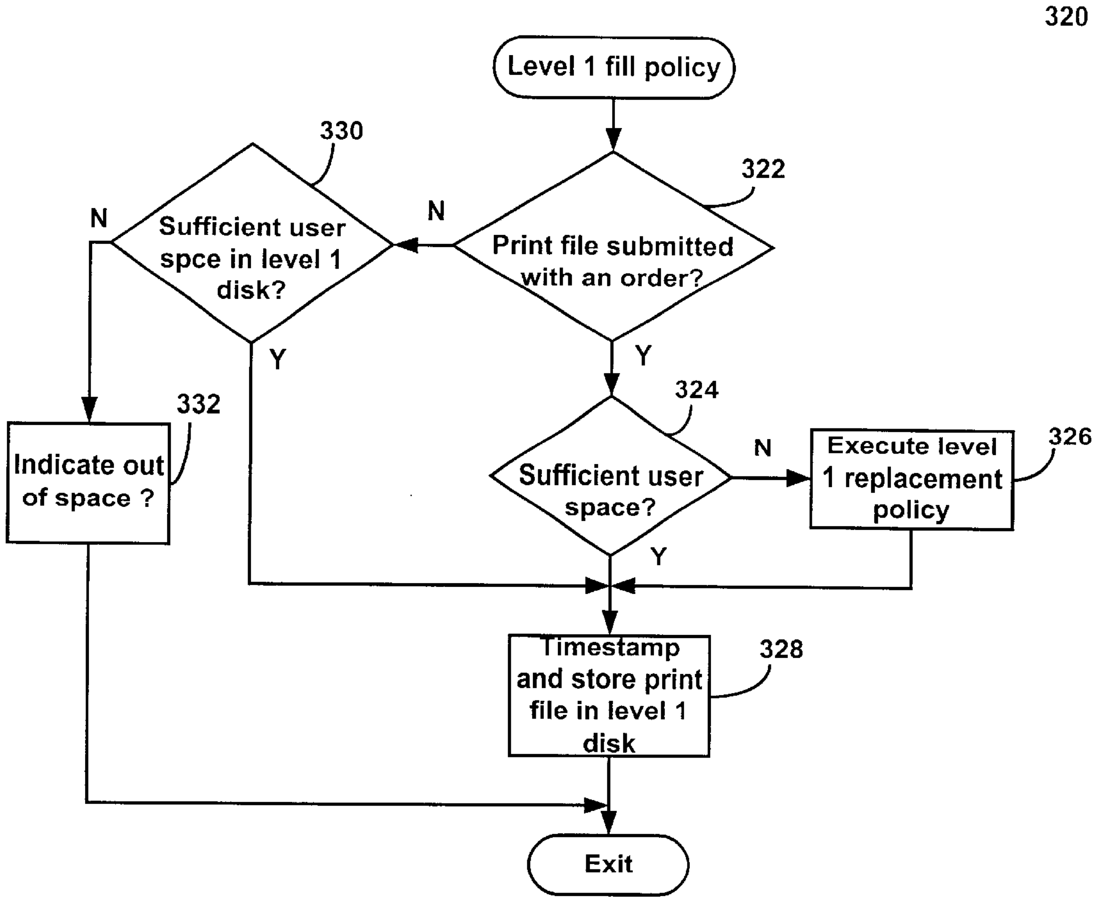
FIG. 4 is a flowchart illustrating a process for filling a first level data storage subsystem in FIG. 2.

FIG. 4 shows a process 320 implementing a fill policy executed by the Level 1 server 210. The process 320 first checks whether the image file is submitted with an order for physical prints (step 322). If so, the process further checks whether sufficient user space exists (step 324). If not, the process executes a Level 1 replacement policy (step 326). Step 326 is illustrated in more detail in FIG. 5. From step 324 or step 326, the process 320 timestamps the file and stores the image file in the disk of the Level 1 server 210 (step 328) before exiting.

From step 322, if the image file is not submitted with an order for physical prints, the process 320 proceeds to step 330 to determine whether sufficient space exists in the user's allocated partition. If so, the submitted file is timestamped and stored in the user's disk space in step 328. Alternatively, if insufficient space exists in the user's partition, the process 320 indicates an out-of-space error condition (step 332) and exits.

Figure 5:
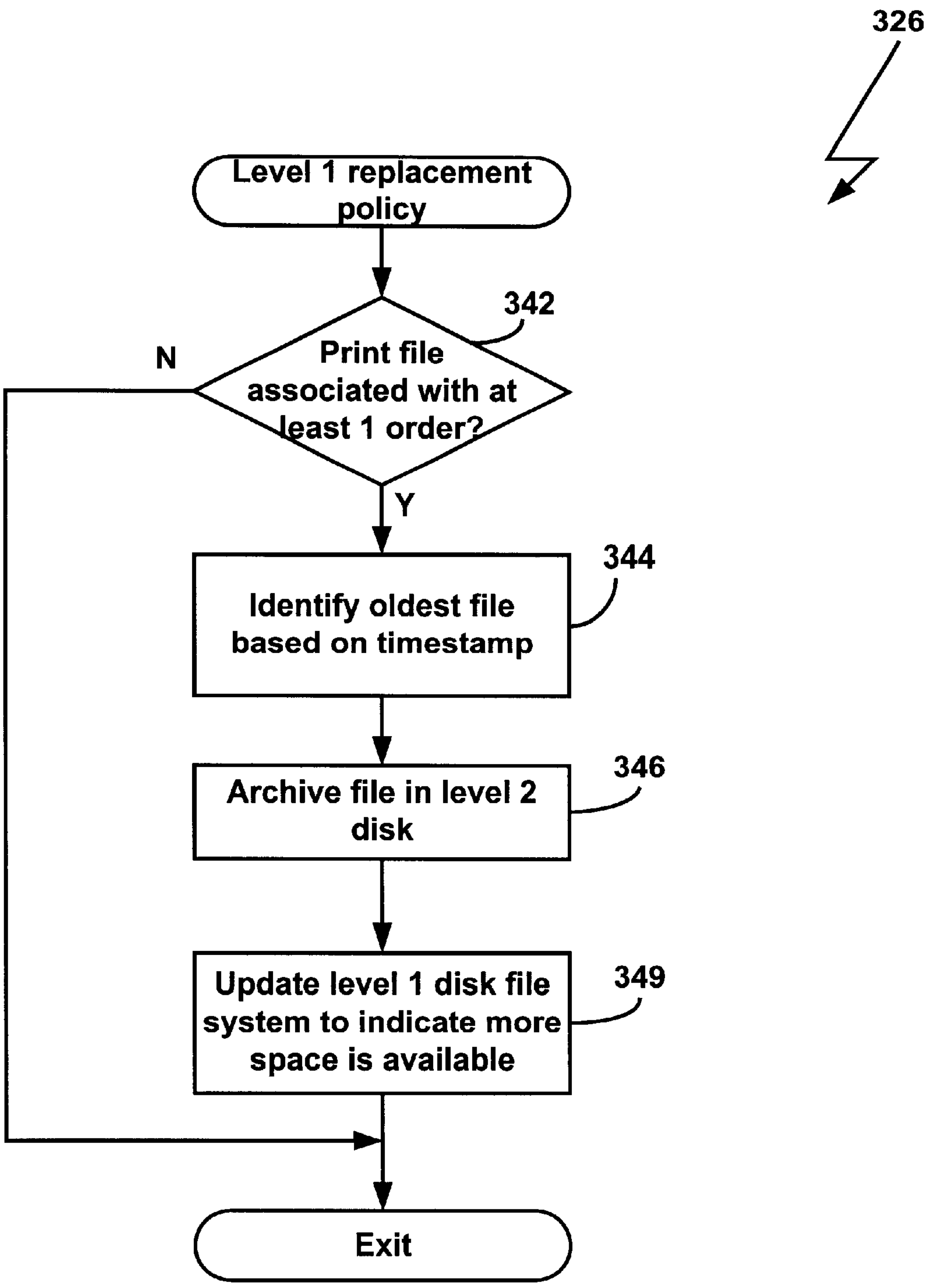
FIG. 5 is a flowchart illustrating a process for replacing files stored in the first level data storage subsystem in FIG. 2.

Turning now to FIG. 5, the process 326 that executes a replacement policy in the Level 1 server 210 is detailed. First, the process 326 checks whether an image file is associated with an order for at least one print (step 324). If so, the image file to be replaced will be archived. In this process, the oldest file is identified based on its timestamp (step 344). The identified file is then archived in the disk for the Level 2 server 230 (step 346). Next, the Level 1 disk file system is updated to indicate that additional space has become available (step 349).

From step 342, in the event that the target image file is not associated with any print order, if this file has been targeted for replacement, it is simply flushed or deleted from the Level 1 disk space (step 348). From step 348, the process 326 proceeds to step 349 to update the Level 1 disk file system.

The Level 2 server 230 is an archival device. Hence, it simply stores all files presented to it. In contrast, the Level 3 server 220 has a fill policy and a replacement policy, as discussed below.

Figure 6:
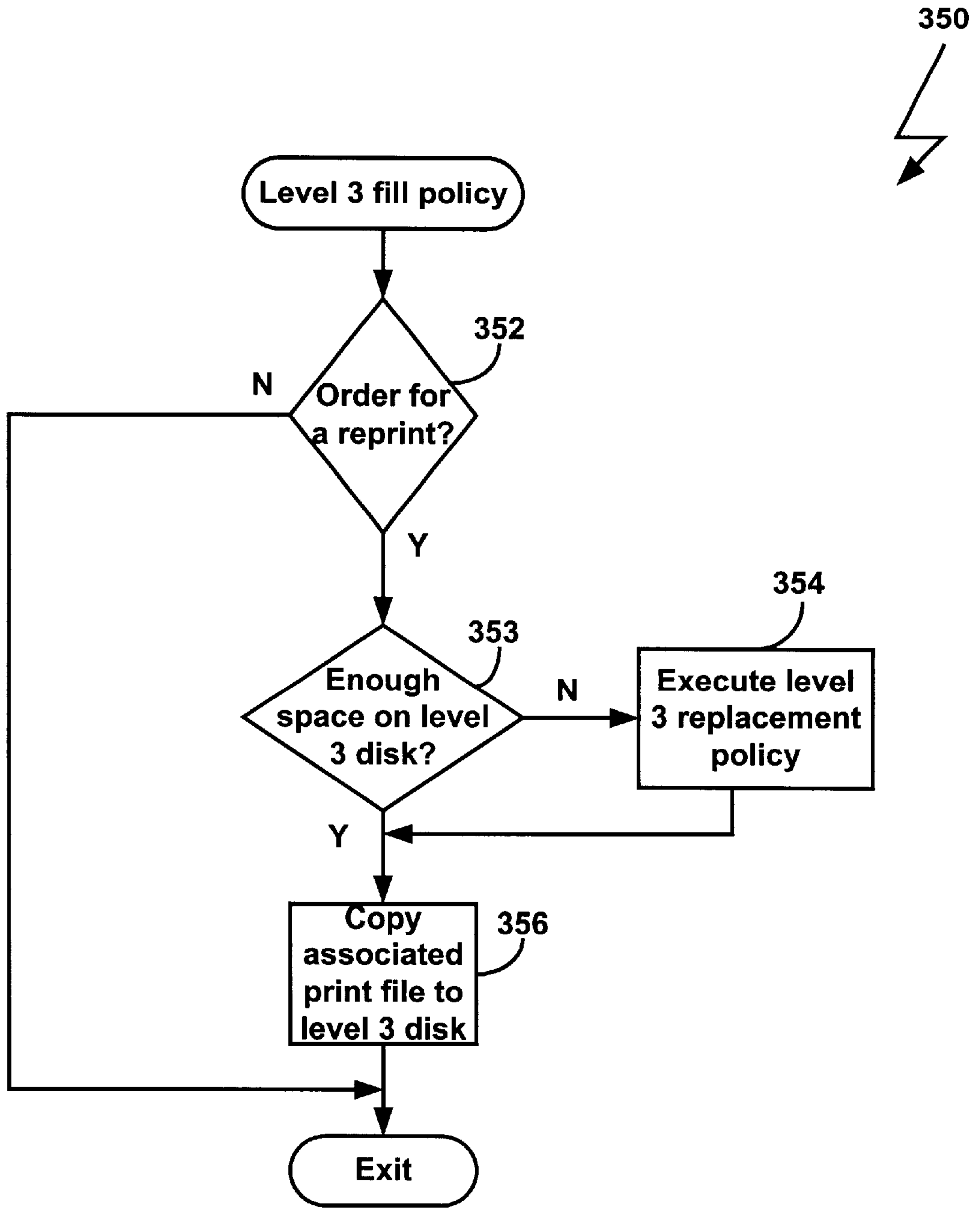
FIG. 6 is a flowchart illustrating a process for filling a third level data storage subsystem in FIG. 2.

FIG. 6 illustrates a process 350 for executing a fill policy performed by the Level 3 server 220. The process 350 first checks whether the incoming request relates to an image that has previously been archived (step 352). If so, the process 350 further checks whether sufficient space exists on the Level 3 server's disk (step 353). If not, a Level 3 replacement policy process is executed (step 354). From step 353 or step 354, the process 350 copies an associated image file to the Level 3 server's disk (step 356). From step 352 or 356, the process 350 exits.

Figure 7:
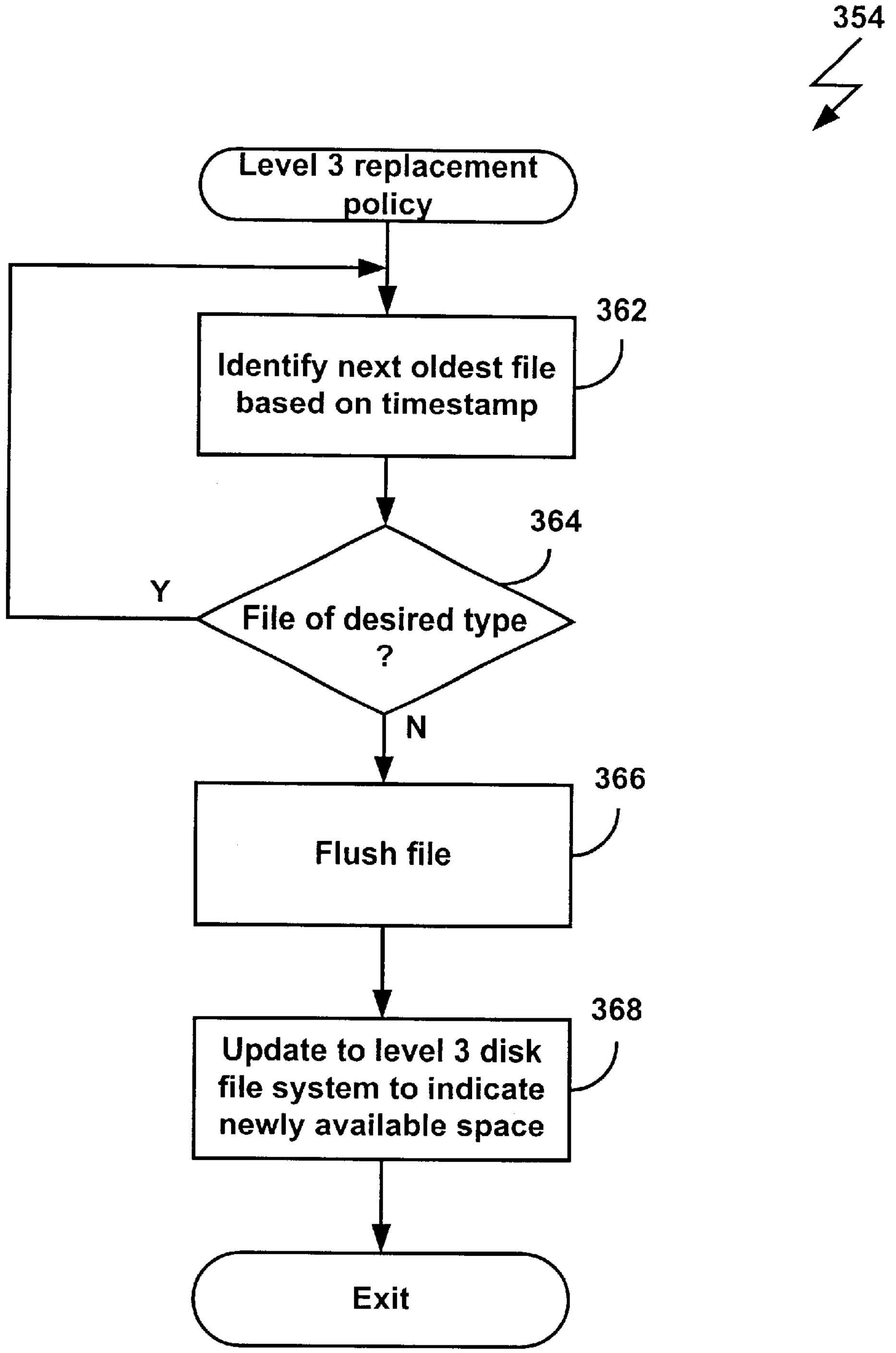
FIG. 7 is a flowchart illustrating a process for replacing files stored in the third level data storage subsystem in FIG. 2.

Referring now to FIG. 7, the Level 3 server's replacement policy is illustrated in more detail. First, the process 354 identifies the next oldest file available (step 362). The age of the file is determined based on its time stamp. From step 362, the process 354 checks whether the file is of a particular type that needs to be retained on the Level 3 server's disk (step 364). For example, if the file relates to a desired file type (such as a thumbnail file in one embodiment), it will be retained on the Level 3 server because this type of file is likely to be perused by the user. In step 364, if the file is a desired file type, the process 354 loops back to step 362 to identify the next available oldest file in accordance with its timestamp.

From step 364, if the file type is such that it can be purged, the file is flushed (step 366). Next, the process 354 updates the Level 3 server 220's disk file system to indicate that space has become available (step 368) and exits.

Figure 8:
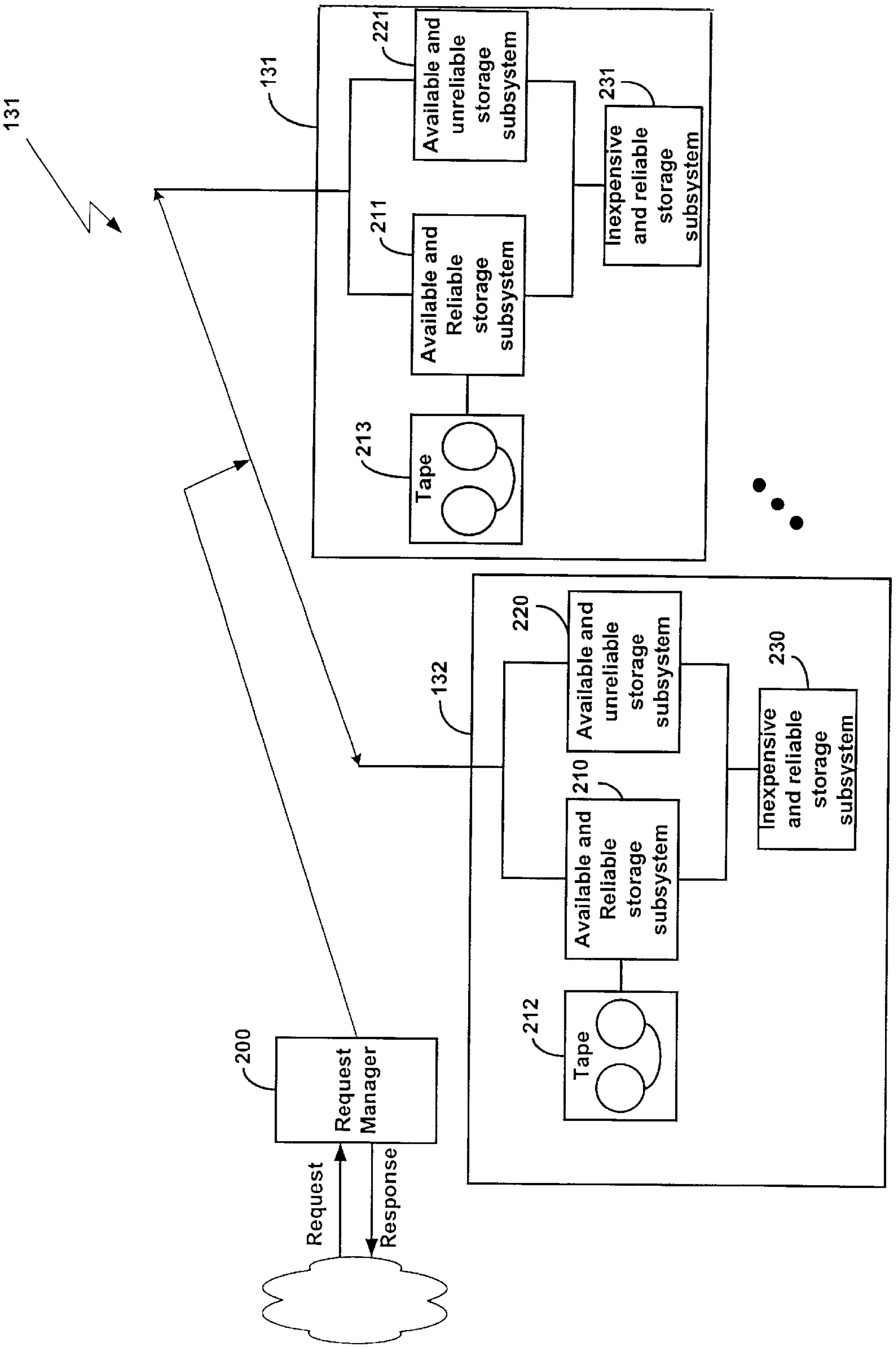
FIG. 8 is a block diagram of a load-balancing embodiment using a plurality of the multi-tier data storage system of FIG. 2.

The scalability of the image archive database 130 is illustrated in FIG. 8. As shown therein, the request manager 200 communicates with a plurality of image archive database systems 131 and 132 with a plurality of Level 1 servers 210 and 211, Level 3 servers 220 and 221 and Level 2 servers 230 and 231, respectively. The request manager 200 can perform load balancing between systems 131 and 132 using any of a plurality of algorithms. For instance, a request coming from users whose ID numbers are even can be directed to the image archive database 131, while all requests from users whose IDs end with odd numbers can be directed to the image archive database 132.

Other load balancing algorithms could be used instead or in addition. For example, in a system with numerous users, a plurality of image archive database systems 130 can be deployed, each assigned to cover users associated with a particular alphabetic character or a particular city. As requests come in, the request manager 200 would index the user ID numbers using a database or a hash table and forward the request to the respective image archive database system.

Figure 9:
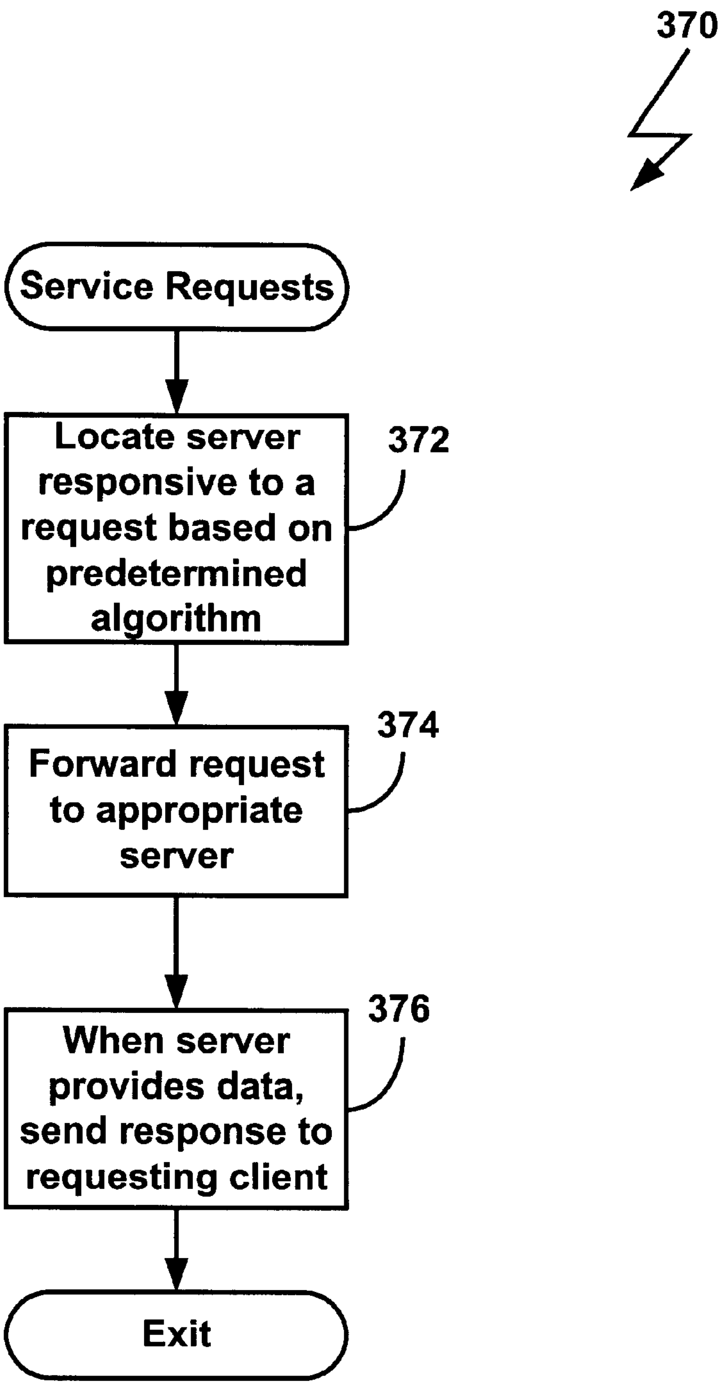
FIG. 9 is a flowchart of a process executed by the system of FIG. 8.

A process executed by the request manager for the system of FIG. 8 is illustrated in more detail in FIG. 9. In response to a request, the process 370 locates a server responsive to the request based on a predetermined algorithm, as discussed above (step 372). The process 370 then forwards a request to the appropriate server (step 374). When the respective server provides the data in response to the forwarded request, the process 370 sends a response to the requesting client (step 376).

Figure 10:
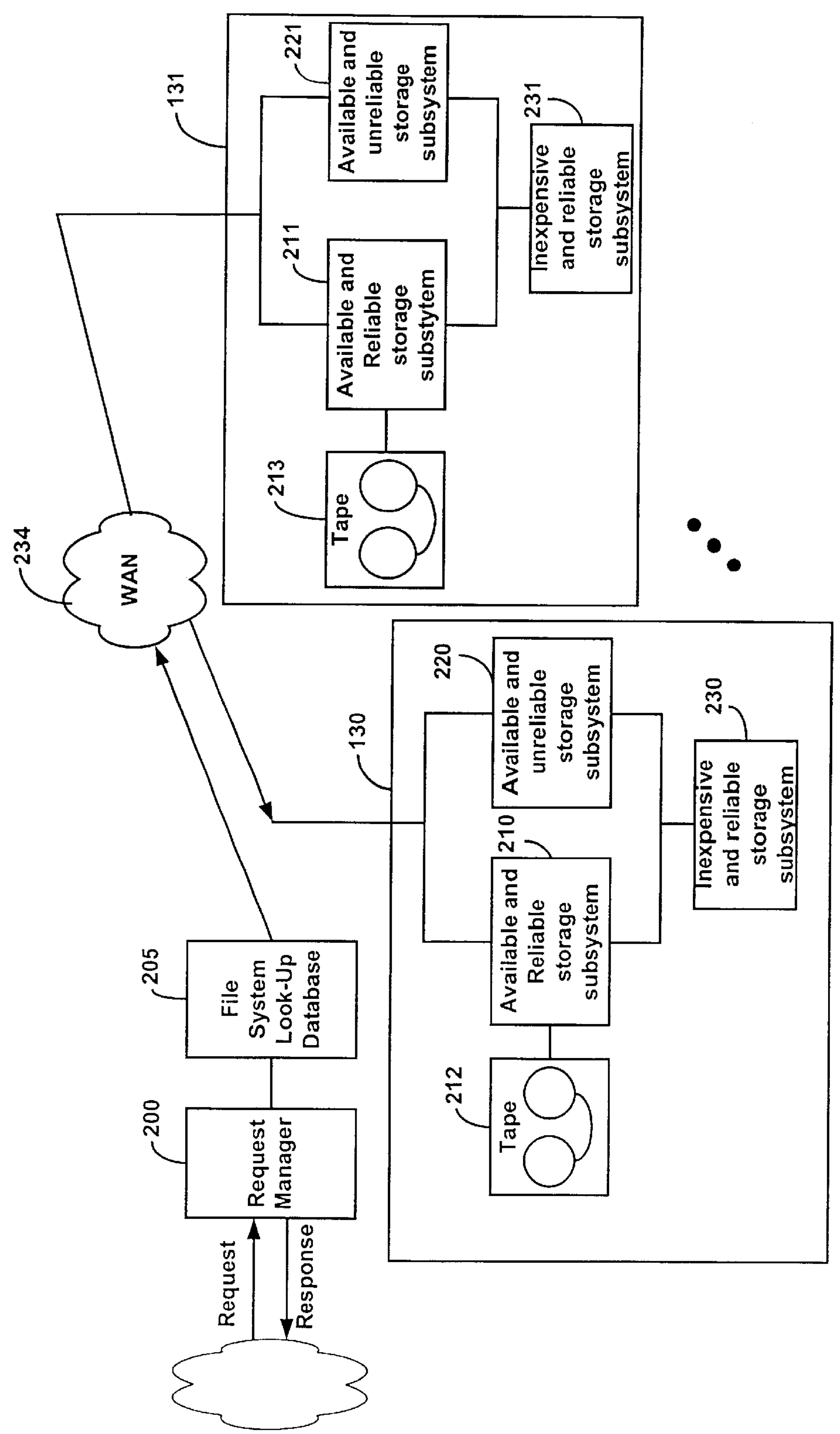
FIG. 10 is a block diagram of a geographically distributed load-balancing embodiment using a plurality of the multi-tier data storage system of FIG. 2.

FIG. 10 shows an alternative embodiment to that of FIG. 8, where the image archive databases 130 and 131 are geographically separated and need to communicate over a wide area network 234. In this case, a file system lookup database 205 is provided between the request manager 200 and the wide area network 234. In this embodiment, the request manager 204 forwards the request to the file system lookup database 205. The lookup database 205 in turn determines the appropriate image archive database system to forward the request to. For instance, the file system lookup database can determine that image files associated with a particular user reside in an image archive database system in a different city. The lookup database 205 in turn would forward the request over the WAN 234 so that the appropriate image archive database system can respond. This process is shown in more detail in FIG. 11.

Figure 11:
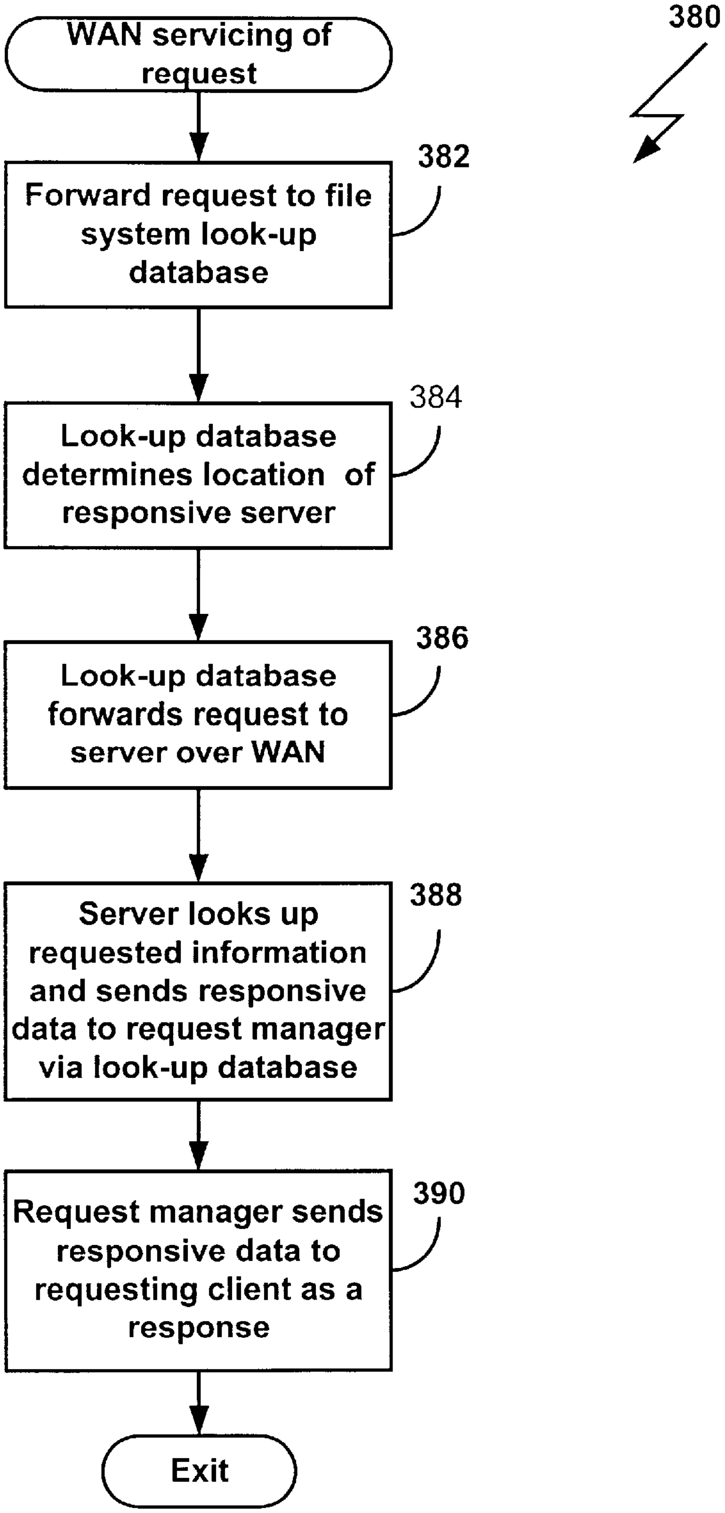
FIG. 11 is a flowchart of a process for servicing requests over a wide area network.

Turning now to FIG. 11, a process 380 for servicing requests over a WAN is shown. First, the request manager 200 forwards the request to the file system lookup database 205 (step 382). Next, the lookup database 205 determines the location of a responsive image archive database server (step 384). The lookup database step 205 in turn forwards the request to the respective server over the WAN 234 (step 386). The server then looks up the requested information and sends responsive data to the request manager 200 over the WAN 234 (step 388). Finally, the request manager 200 then sends the responsive data to a requesting client as a response (step 390).

Figure 12:
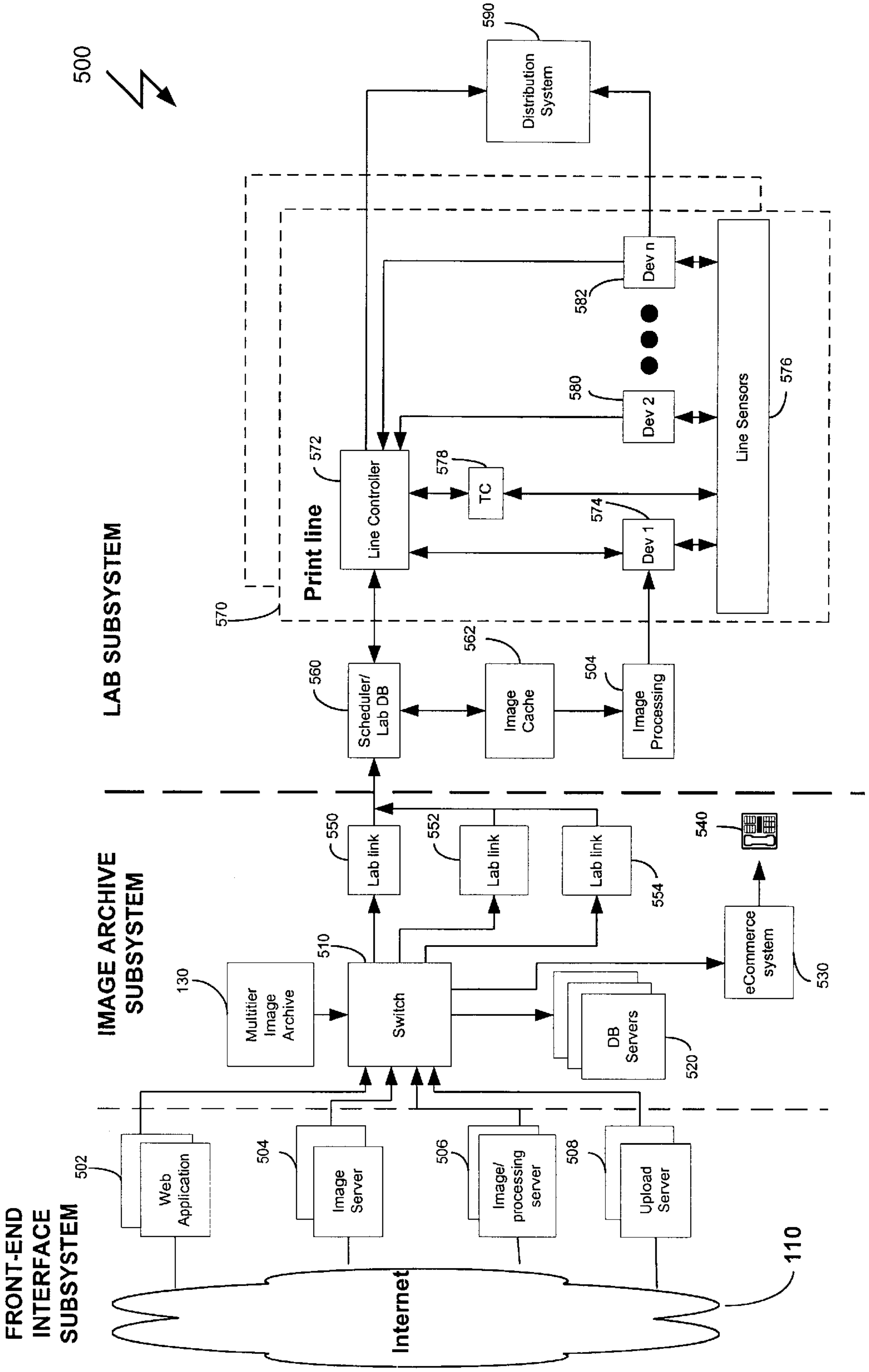
FIG. 12 is a block diagram of an embodiment of a print laboratory system using the plurality of the multi-tier data storage system of FIG. 2.

FIG. 12 illustrates an embodiment that deploys the image archive subsystem of FIG. 2 in an application for handling photographic print images. The system of FIG. 12 has a front-end interface subsystem that is connected to the Internet 110. The front end interface subsystem includes one or more web application systems 502, one or more image servers 504, one or more image processing servers 506, and one or more upload servers 508, all of which connect to a switch 510.

The switch 510 in turn routes packets received from the one or more web application systems 502, image servers 504, image processing servers 506 and upload servers 508 to the multi-tier image archive system 130.

The switch 510 also forwards communications between the web application systems 502, image servers 504, image processing servers 506 and upload servers 508 to one or more database servers 520. The switch 510 also is in communication with an e-commerce system 530 that can be connected via a telephone 540 to one or more credit card processing service providers such as VISA and MasterCard.

The switch 510 also communicates with one or more lab link systems 550, 552 and 554. These lab link systems in turn communicate with a scheduler database system 560. The scheduler database system 560 maintains one or more print images on its image cache 562. Data coming out of the image cache 562 is provided to an image processing module 564. The output of the image processing module 564 is provided to one or more film development lines 574, 580 and 582.

The scheduler database 560 also communicates with a line controller 572. The line controller 572 communicates with a quality control system 578 that checks prints being provided from the photographic film developing lines 574, 580 and 584. The quality of prints output by the film developing lines 534, 580 and 582 are sensed by one or two more line sensors 576, which reports back to the quality controller 578. The output of the print line 570 is provided to a distribution system 590 for delivery to the users who requested that copies of the prints.

The multi-tier system uses a name resolution protocol to locate the file within the multi-tier structure. In this protocol, given an image ID, an image can be located on the multi-tier system without incurring the cost of accessing a name database. This is achieved because each image ID is unique and database lookups are not needed to resolve the desired image. This level of scalability is important since it provides the ability to scale the image retrieval bandwidth by just increasing the number of image server independent of the number of database servers. In order words, the name resolution protocol decouples the database bottleneck from the image retrieval bottleneck.

Figure 13:
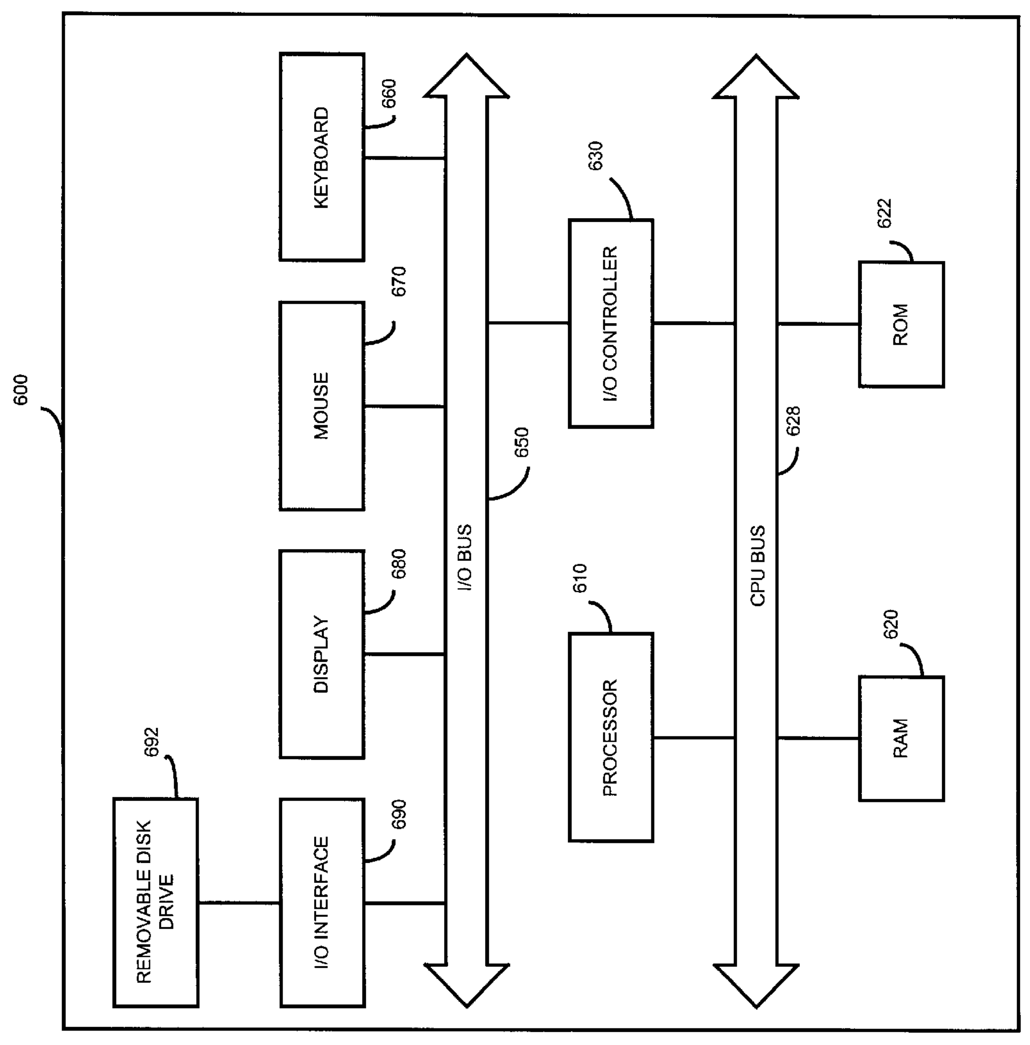
FIG. 13 is a block diagram of a computer system capable of supporting the above processes.

The invention may be implemented in digital hardware or computer software, or a combination of both. Preferably, the invention is implemented in a computer program executing in a computer system. Such a computer system may include a processor, a data storage system, at least one input device, and an output device. FIG. 13 illustrates one such computer system 600, including a processor (CPU) 610, a RAM 620, a ROM 622 and an I/O controller 630 coupled by a CPU bus 628. The I/O controller 630 is also coupled by an I/O bus 650 to input devices such as a keyboard 660, a mouse 670, and output devices such as a monitor 680. Additionally, one or more data storage devices 692 is connected to the I/O bus using an I/O interface 690.

Further, variations to the basic computer system of FIG. 12 are within the scope of the present invention. For example, instead of using a mouse as user input devices, a pressure-sensitive pen, digitizer or tablet may be used.

The above-described software can be implemented in a high level procedural or object-oriented programming language to operate on a dedicated or embedded system. However, the programs can be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Other embodiments are within the scope of the following claims.

What is claimed is:

1. A multi-tier data storage system to support photographic printing of uploaded digital images, comprising:

a first data storage unit for storing digital images uploaded over a network;

a second data storage unit coupled to the first data storage unit for archiving digital images residing on the first data storage unit for more than a predetermined period;

a third data storage unit coupled to the second data storage unit, the third data storage unit caching a requested digital image from the second data storage unit if the requested digital image is unavailable on the first data storage unit; and, a printer coupled to one of the first, second or third data storage units, the printer accessing a digital image from one of the data storage units to produce a print.

2. The apparatus of claim 1, wherein the first data storage unit comprises an available data storage system.

3. The apparatus of claim 1, wherein the second data storage unit comprises a jukebox.

4. The apparatus of claim 1, wherein the third data storage unit comprises an available data storage system.

5. The apparatus of claim 1, further comprising a backup data storage device coupled to the first data storage unit.

6. The apparatus of claim 1, wherein the backup data storage unit comprises a tape drive.

7. The apparatus of claim 1, wherein the second data storage unit comprises a writeable digital video disk (DVD).

8. The apparatus of claim 1, wherein the first data storage unit further comprises a RAID disk array.

9. The apparatus of claim 1, wherein the first data storage unit periodically flushes unused digital images.

10.The apparatus of claim 1, wherein each data storage unit stores digital images based on a unique identification encoding.

11. The apparatus of claim 10, wherein the unique identification encoding includes a location value.

12. The apparatus of claim 10, wherein the unique identification encoding includes a user identification value.

13. The apparatus of claim 10, wherein the unique identification encoding includes a timestamp.

14. The apparatus of claim 10, wherein the unique identification encoding includes an image type value.

15. The apparatus of claim 10, wherein each data storage unit has a multi-tiered directory lay-out schema.

16. The apparatus of claim 10, wherein the multi-tiered directory lay-out schema includes a tier based on the year, the month, and the day when an image is submitted.

17. The apparatus of claim 1, wherein the multi-tiered directory lay-out schema includes a tier based on the hour and the minute when an image is submitted.

18. The apparatus of claim 1, wherein the multi-tiered directory lay-out schema includes a tier based on a user identification value.

19. The apparatus of claim 1, wherein the digital images include one or more thumbnail and raw images stored on the first data storage unit.

20. The apparatus of claim 1, wherein the digital images include one or more screen image files and cached raw image files stored on the third data storage unit.

21. A method for managing a multi-tier data storage system, the method comprising:

storing uploaded image data files in a first data storage unit;

archiving in a second data storage unit data files residing on the first data storage unit for more than a predetermined period;

caching in a third data storage unit a data file stored in the second data storage unit if the data file is unavailable on the first data storage unit; and producing a print from an image data file stored in one of the first, second or third data storage units.

22. The method of claim 21, wherein the first data storage unit comprises an available data storage system.

23. The method of claim 21, wherein the second data storage unit comprises an archival device.

24. The method of claim 21, wherein the third data storage unit comprises an available data storage system.

25. The method of claim 21, wherein the data files are imaging data files.

26. The method of claim 21, further comprising storing data files based on a unique identification encoding.

27. The method of claim 26, wherein the unique identification encoding includes a location value.

28. The method of claim 26, wherein the unique identification encoding includes a user identification value.

29. The method of claim 26, wherein the unique identification encoding includes a timestamp.

30. The method of claim 26, wherein the unique identification encoding includes an image type value.

31. The method of claim 26, wherein each data storage unit has a three-tiered directory lay-out schema.

32. The method of claim 31, wherein the three-tiered directory lay-out schema includes a tier based on the year, the month, and the day when an image is submitted.

33. The method of claim 31, wherein the three-tiered directory lay-out schema includes a tier based on the hour and the minute when an image is submitted.

34. The method of claim 31, wherein the three-tiered directory lay-out schema includes a tier based on a user identification value.

35. The method of claim 21, wherein the data files include one or more thumbnail images stored on the first data storage unit.

36. The method of claim 21, wherein the data files include one or more screen image files and raw image files stored on the first and third data storage unit.

37. A method for generating a path name directory, comprising:

generating a unique file identification value based on a location value, a user identification value, a timestamp, and an image type;

storing data files based on generated unique identification values; and producing a print from a data file stored in one or more data storage units in accordance with the unique file identification value.

38. The method of claim 37, wherein each data storage unit has a three-tiered directory lay-out schema.

39. The method of claim 38, wherein the three-tiered directory lay-out schema includes a tier based on the year, the month, and the day when an image is submitted.

40. The method of claim 38, wherein the three-tiered directory lay-out schema includes a tier based on the hour and the minute when an image is submitted.

41. The method of claim 38, wherein the three-tiered directory lay-out schema includes a tier based on a user identification value.

42. The method of claim 37, wherein the unique identification value comprises an image identification value.

43. The method of claim 37, further comprising retrieving a file based on the unique identification value.

44. The method of claim 43, wherein the file is retrieved without referencing a file name database.

45. A computer-implemented method for managing a digital image data storage system, the method comprising:

storing a digital image in a first image storage tier having predetermined performance characteristics; and moving the digital image from the first image storage tier to one or more other image storage tiers based on a predetermined criterion including a third tier caching a requested digital image from a second tier if the requested digital image is unavailable on the first tier, the other image storage tiers having performance characteristics different from the first image storage tier's performance characteristics; and producing a print from the digital image stored in one of the image storage tiers.

46. The computer-implemented method of claim 45, wherein the other storage tiers comprise a second image storage tier and a third image storage tier, each having different performance characteristics.

47. The computer-implemented method of claim 45, wherein the performance characteristics of the first image tier include availability, reliability and cost.

48. The computer-implemented method of claim 45, wherein the performance characteristics of the second image tier include archival capacity.

49. The computer-implemented method of claim 45, wherein the performance characteristics of the third image tier include availability and intermediate cost between the first and second image tiers.

50. The computer-implemented method of claim 46, further comprising:

storing recently loaded data files in the first data storage unit;

storing in the second data storage unit data files residing on the first data storage unit for more than a predetermined period of time; and, storing in the third data storage unit a data file stored in the second data storage unit if the data file is unavailable on the first data storage unit.

51. A computer-implemented method for storing digital images, the method comprising:

distributing digital images across a plurality of interconnected image storage tiers, including a third tier caching a requested digital image from a second tier if the requested digital image is unavailable on a first tier, each tier having a combination of reliability and availability characteristics that differs from the other image storage tiers, based on predetermined storage policy criteria; and producing a print from a digital image stored in one of the image storage tiers.

52. The computer-implemented method of claim 51, wherein the other storage tiers comprise a second image storage tier and a third image storage tier, each having different performance characteristics.

53. The computer-implemented method of claim 51, wherein the performance characteristics of the first image tier include availability, reliability and cost.

54. The computer-implemented method of claim 51, wherein the performance characteristics of the second image tier include archival capacity.

55. The computer-implemented method of claim 54, wherein the performance characteristics of the third image tier include availability and intermediate cost between the first and second image tiers.

56. The computer-implemented method of claim 55, further comprising:

storing loaded data files in the first data storage unit;

storing in the second data storage unit data files residing on the first data storage unit for more than a predetermined period of time; and, storing in the third data storage unit a data file stored in the second data storage unit if the data file is unavailable on the first data storage unit.

57. A digital image storage system comprising:

a plurality of interconnected image storage tiers and including a third tier caching a requested digital image from a second tier if the requested digital image is unavailable on a first tier, each tier having a combination of reliability and availability characteristics that differs from the other image storage tiers;

a plurality of predetermined image storage policies;

a controller for moving digital images among different image storage tiers based on the plurality of predetermined image storage policies; and a printer coupled to the image storage tiers, the printer producing a print from a digital image stored in one of the image storage tiers.

58. The system of claim 57, wherein the other storage tiers comprise a second image storage tier and a third image storage tier, each having different performance characteristics.

59. The system of claim 57, wherein the performance characteristics of the first image tier include high availability, reliability and cost.

60. The system of claim 57, wherein the performance characteristics of the second image tier include a large archival capacity and inexpensive.

61. The system of claim 57, wherein the performance characteristics of the third image tier include high availability and intermediate cost.

62. The system of claim 61, further comprising:

storing loaded data files in the first data storage unit;

storing in the second data storage unit data files residing on the first data storage unit for more than a predetermined period of time; and, storing in the third data storage unit a data file stored in the second data storage unit if the data file is unavailable on the first data storage unit.

63. A protocol for managing a digital image storage system, the protocol comprising:

a unique file identification value based on a location value, a user identification value, a timestamp, and an image type; and data files that are stored based on generated unique identification values, the data files adapted to be used in producing a print.

64. The protocol of claim 63, wherein each data storage unit has a three-tiered directory lay-out schema.

65. The protocol of claim 63, wherein the three-tiered directory lay-out schema includes a tier based on the year, the month, and the day when an image is submitted.

66. The protocol of claim 63, wherein the three-tiered directory lay-out schema includes a tier based on the hour and the minute when an image is submitted.

67. The protocol of claim 63, wherein the three-tiered directory lay-out schema includes a tier based on a user identification value.

68. The protocol of claim 67, wherein the unique identification value comprises an image identification value.

69. The protocol of claim 68, wherein a file is retrieved based on the unique identification value.

70. The protocol of claim 63, wherein the file is retrieved without referencing a file name database.

71. A protocol for managing a digital image storage system, the protocol comprising:

storing loaded data files in a first data storage unit;

storing in a second data storage unit data files residing on the first data storage unit for more than a predetermined period of time; and, storing in a third data storage unit a data file stored in the second data storage unit if the data file is unavailable on the first data storage unit; and producing a print from a digital image data file stored in one of the data storage units.

72. The protocol of claim 71, wherein the first data storage unit comprises an available data storage system.

73. The protocol of claim 71, wherein the second data storage unit comprises an archival device.

74. The protocol of claim 71, wherein the third data storage unit comprises an available data storage system.

75. The protocol of claim 71, wherein the data files are imaging data files.

76. A computer-implemented method for managing a digital image storage system, the method comprising:

storing, upon receipt, a received digital image in a first image storage tier;

detecting that the digital image has resided on the first image storage tier for a predetermined period of time;

moving the digital image from the first image storage tier to a second image storage tier;

detecting that an attempt to access the digital image on the first image storage tier was unsuccessful;

moving the digital image from the second image storage tier to a third image storage tier; and producing a print from a digital image stored in one of the image storage tiers.

77. The method of claim 76, further comprising providing access to digital image on third tier.

78. The method of claim 76, further comprising storing data files based on a unique identification encoding.

79. The method of claim 78, wherein the unique identification encoding includes a location value.

80. The method of claim 78, wherein the unique identification encoding includes a user identification value.

81. The method of claim 78, wherein the unique identification encoding includes a timestamp.

82. The method of claim 78, wherein the unique identification encoding includes an image type value.

83. The method of claim 78, wherein each data storage unit has a three-tiered directory lay-out schema.

84. The method of claim 83, wherein the three-tiered directory lay-out schema includes a tier based on the year, the month, and the day when an image is submitted.

85. The method of claim 83, wherein the three-tiered directory lay-out schema includes a tier based on the hour and the minute when an image is submitted.

86. The method of claim 83, wherein the three-tiered directory lay-out schema includes a tier based on a user identification value.

87. A method for managing a digital image storage system, comprising:

generating a functional path name directory based on a unique file identification value;

storing data files based on generated unique identification values; and accessing a digital image based on the functional path name directory and producing a print from the digital image.

88. The method of claim 87, wherein the unique file identification is generated based on a location value, a user identification value, a timestamp, and an image type.

89. The method of claim 87, further comprising one or more data storage units, wherein each data storage unit has a three-tiered directory lay-out schema.

90. The method of claim 89, wherein the three-tiered directory lay-out schema includes a tier based on the year, the month, and the day when an image is submitted.

* * * * *